MULTI-UNIT PACKAGE

Original Filed Sept. 14, 1962 2 Sheets-Sheet 1

INVENTOR
ISAAC L. WILCOX
BY Young & Quigg
ATTORNEYS

MULTI-UNIT PACKAGE

Original Filed Sept. 14, 1962 2 Sheets-Sheet 2

INVENTOR
ISAAC L. WILCOX
BY Young & Quigg
ATTORNEYS

United States Patent Office

Re. 25,966
Reissued Feb. 22, 1966

25,966
MULTI-UNIT PACKAGE

Isaac L. Wilcox, Fulton, N.Y., assignor, by mesne assignments, to Phillips Petroleum Company, a corporation of Delaware Original No. 3,114,496, dated Dec. 17, 1963, Ser. No. 223,609, Sept. 14, 1962. Application for reissue Aug. 9, 1965, Ser. No. 480,833
6 Claims. (Cl. 229—52)

Matter enclosed in heavy brackets [ ] appears in the original patent but forms no part of this reissue specification; matter printed in italics indicates the additions made by reissue.

This invention relates to a multi-unit package consisting of two containers rectangular in cross section, and arranged in standing side by side abutting relation. The invention has to do particularly with the joining of the containers to form the package and simultaneously providing a handle for manipulating and carrying the package.

In the embodiment of the invention here shown, the containers making up the package consist of cartons formed of paperboard and employed for the packaging of liquid products, such as milk. At the present time there is considerable demand for packaging milk in gallon and half-gallon packages. It is preferable to use smaller unit cartons joined together to make up the larger package, the joinder of the smaller units embodying an arrangement which permits the separation of the units by the customer.

Heretofore, paperboard cartons rectangular in cross section have been joined to make up a multi-unit package, the most practical method of joinder being by the use of adhesive to adhere the abutting sides of the cartons together. When that method is properly carried out, it provides a suitable multi-unit package. However, the adhesive arrangement has many disadvantages. First, the adhesive method requires that the unit cartons making up the package must be tightly pressed together for a period of three hours or more, to give the wet adhesive an opportunity to penetrate the abutting side walls of the cartons and to set. In the packaging of milk, this requires that the pairs of cartons have to be compressed by the insertion of wedges in the shipping case. This requires time and labor and, prior to the shipment of the filled cases from the dairy, the wedges must be removed.

In one such arrangement, a handle has been provided in the form of a piece of stiff cardboard inserted between the abutting sides of the cartons, and adhered thereto by the wet adhesive. The upwardly protruded semi-rigid handle prevents the multi-unit packages from being cased by an automatic casing machine. Also, when the cases are stacked one upon another in the refrigerator room, the rigid cardboard handles become bent over and often damaged to the extent that they will not subsequently serve as a supporting handle for the package.

This invention has as an object a multi-unit package embodying a novel arrangement wherein the handle is in the form of a thin strip of flexible material extending transversely of the package and having its end portions depending and bonded to the upper portions of the side walls of the unit cartons adjacent the junction thereof. The handle member is bonded to the cartons in a fraction of a second and maintains the unit cartons in tight abutting parallel relation.

The invention consists in the novel features and in the combinations and constructions hereinafter set forth and claimed.

In describing this invention, reference is had to the accompanying drawings in which like characters designate corresponding parts in all the views.

Referring to the drawings—

Figure 1:
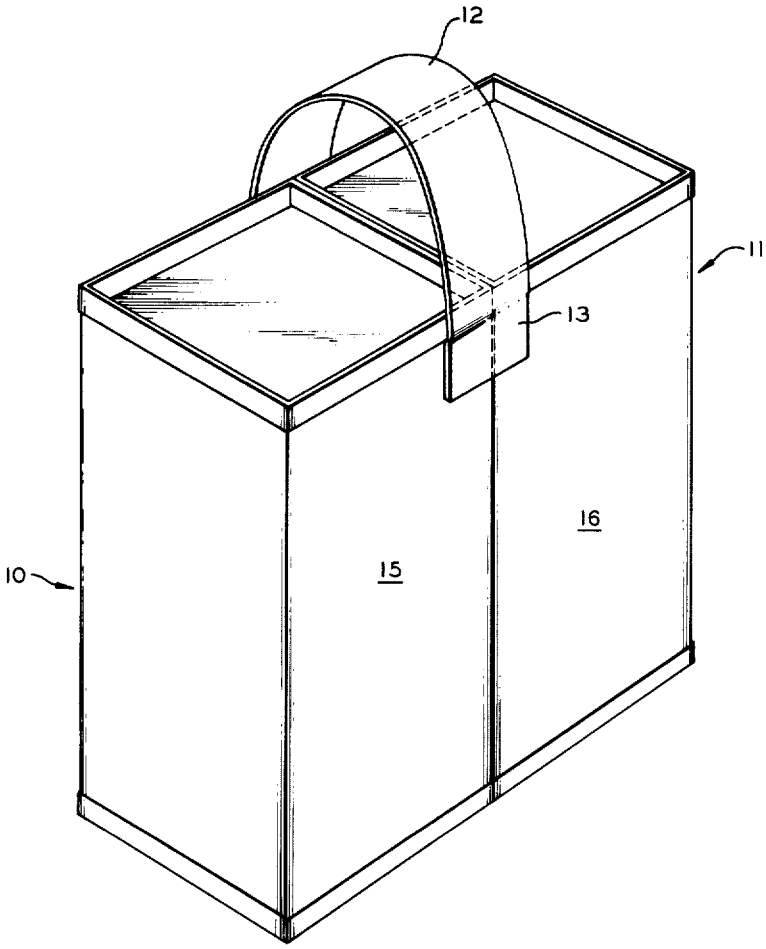
FIGURE 1 is a perspective view of a multi-unit package embodying my invention.

The cartons 10, 11, are formed of plastic coated paperboard and are square in cross sectional form. The handle member consists of a strip 12 of thin, flexible material. The strip may be formed of thermoplastic material, such as [polyester] *polyethylene,* or it may be formed of *a non-thermoplastic material, such as* high strength paper, coated, at least on its under side, with thermoplastic material.

The strip 12 is of a length appreciably greater than the width of the cartons 10, 11. The end portions 13 of the strip are positioned in overlapping relation to the upper portions of the side walls 15 of the carton 10 and the side walls 16 of the carton 11. That is, the end portions 13 of the strip 12 are positioned over the upper portions of the side walls at the junction formed by the abutting sides of the cartons. These end portions 13 are fixedly bonded to the opposite sides of the cartons by being heat-sealed thereto while the cartons are positioned in abutting relation.

The intermediate portion of the strip is in the form of an arcuate shaped handle extending transversely above the package. The bonded end portions 13 of the strip 12 serve to fixedly unite the cartons 10, 11, and maintain them in abutting relation.

Figure 2:
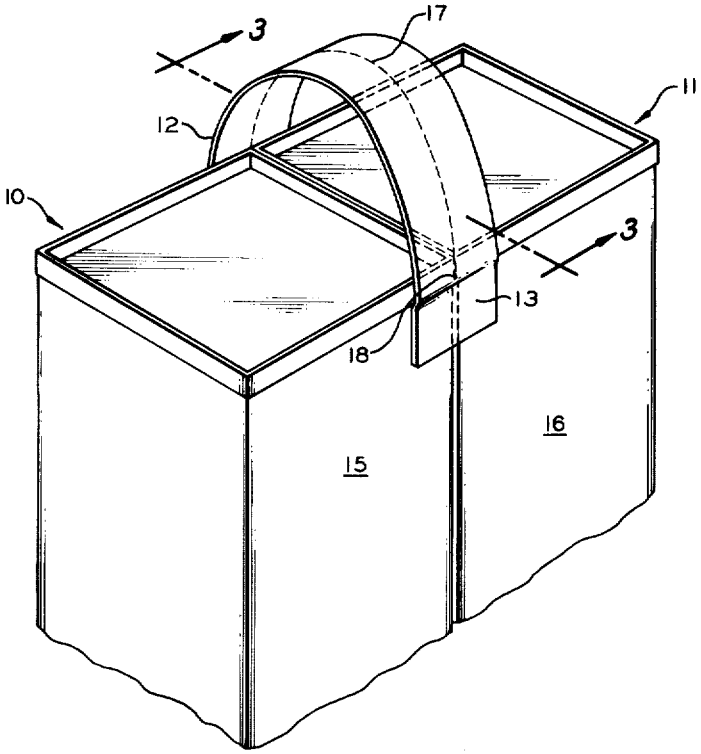
FIGURE 2 is a view, similar to FIGURE 1, showing a modified handle member.
Figure 3:
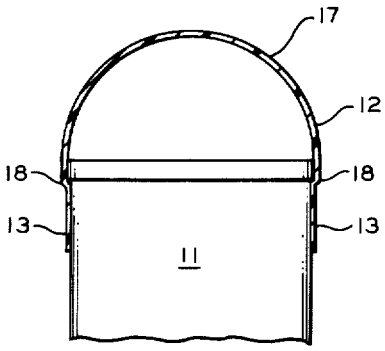
FIGURE 3 is a view taken on line 3—3, FIGURE 2.

As shown in FIGURES 2 and 3, the strip 12 may be formed with a weakened portion [15] *17,* as by a *slot or a* row of perforations extending in a direction lengthwise of the strip, medial the side edges thereof. The ends [16] *18* of the weakened area terminate adjacent the end portions 13. The cartons may be separated by grasping the lower portions thereof and moving them in a direction away from each other. This provides sufficient leverage on the end portions 13 to cause the same to split in a direction lengthwise of the strip 12 from the lower edges of the portions 13 upwardly to the ends [16] *18* of the perforations [15] *17,* and thereupon the handle 12 will completely separate. This arrangement leaves a narrow handle attached to each carton for the convenient manipulation thereof.

The heat sealing of the end portions 13 of the strip is effected substantially instantaneously upon movement of sealing irons into engagement with the end portions. This permits the formation of the multi-unit packages on a conveyor line on which the packages are being advanced at high speed. The end portions 13 being bonded to the upper side wall portions of both cartons is effective to fixedly join the cartons together to form the multi-unit package. The strip 12 may be printed with indicia, or may be colored to make the handle more readily visible when the packages are arranged in a display case in the store.

Because the bonding takes place instantaneously, the multi-unit packages may be handled and cased by an automatic casing machine and, when inserted in the cases, no wedging is necessary for effecting side pressure against the packages.

I claim:

1. A package comprising a pair of containers arranged in upstanding side by side abutting relation, said containers being rectangular in cross section and of like dimension in the direction of the junction of the abutting sides of the containers, a strip of thin flexible material extending transversely of said containers above and parallel to the junction of the abutting sides thereof, the end portions of said strip extending downwardly in juxtaposition to opposite sides of the containers, *at least* the surface of said strip confronting said containers [being coated with]

*comprising* a thermoplastic material, said end portions overlapping the junction between the containers and being heat-sealed by said thermoplastic material to the upper portions of the side walls of both containers at opposite sides of said junction *the portion of said strip between said end portions being spaced from said containers to form a handle.*

2. A package as defined in claim 1, wherein said strip is formed with a weakened area extending medial of its side edges in registration with the junction between the containers, the ends of said weakened area terminating in spaced relation to the sealed ends of said strip.

3. A package as defined in claim 1, wherein said strip is formed with a [slot] *row of perforations* extending medial of the side edges of the strip, and in registration with the junction between said containers, the ends of the [slot] *perforations* terminating adjacent the sealed end portions of the strip.

*4. A package as defined in claim 1, wherein said strip comprises a non-thermoplastic material with the surface thereon confronting said containers being coated with a thermoplastic material.*

*5. A package as defined in claim 4, wherein said non-thermoplastic material is high strength paper.*

*6. A package as defined in claim 1, wherein said strip is formed of thermoplastic material.*

References Cited by the Examiner

The following references cited by the Examiner, are of record in the patented file of this patent or the original patent.

UNITED STATES PATENTS

| | | | |
|---|---|---|---|
| 2,931,491 | 4/1960 | Taylor | 206—65 |
| 3,031,359 | 4/1962 | Blank et al. | 229—52 X |
| 3,065,845 | 11/1962 | Nichols | 229—52 X |

FOREIGN PATENTS

| | | |
|---|---|---|
| 758,894 | 10/1956 | Great Britain. |

JOSEPH R. LECLAIR, *Primary Examiner.*

D. T. MOORHEAD, *Assistant Examiner.*